United States Patent
Sinha et al.

(10) Patent No.: US 12,261,950 B2
(45) Date of Patent: Mar. 25, 2025

(54) IMPLEMENTING ENHANCED COMPUTER SECURITY STANDARD FOR SECURE CRYPTOGRAPHIC KEY STORAGE USING A SOFTWARE-BASED KEYSTORE

(71) Applicant: Okta, Inc., San Francisco, CA (US)

(72) Inventors: Bidan Sinha, Milpitas, CA (US); Kavitha Chandramohan, Ontario (CA); Helen Chen, San Mateo, CA (US); Karthik Bhat, Saratoga, CA (US); Fei Chen, San Francisco, CA (US); Aakash Mehta, San Jose, CA (US); Thanh-Ha Nguyen, San Francisco, CA (US)

( * ) Notice: Subject to any disclaimer, the term of this patent is extended or adjusted under 35 U.S.C. 154(b) by 268 days.

(21) Appl. No.: 17/589,893

(22) Filed: Feb. 1, 2022

(65) Prior Publication Data

US 2023/0246829 A1 Aug. 3, 2023

(51) Int. Cl.
*H04L 9/08* (2006.01)
*H04L 9/32* (2006.01)

(52) U.S. Cl.
CPC .......... *H04L 9/0861* (2013.01); *H04L 9/0822* (2013.01); *H04L 9/0894* (2013.01); *H04L 9/3231* (2013.01)

(58) Field of Classification Search
CPC ... H04L 9/0861; H04L 9/0822; H04L 9/0894; H04L 9/3231
See application file for complete search history.

(56) References Cited

U.S. PATENT DOCUMENTS

| | | | | |
|---|---|---|---|---|
| 8,639,873 | B1 * | 1/2014 | Jevans | G06F 12/0804 711/135 |
| 2014/0112477 | A1 * | 4/2014 | Agarwal | H04L 9/083 380/277 |
| 2014/0123207 | A1 * | 5/2014 | Agarwal | G06F 21/6218 726/1 |
| 2018/0307863 | A1 * | 10/2018 | Jackson | H01L 23/3157 |
| 2019/0379537 | A1 * | 12/2019 | Kärkkäinen | G06F 21/45 |
| 2023/0205908 | A1 * | 6/2023 | Kostushko | H04L 67/1097 726/26 |

OTHER PUBLICATIONS

VMWare, "Protecting Sensitive Government Data on Mobile Devices: Maintaining FIPS 140-2 Compliance," airwatch by VMWare, Jul. 28, 2014, pp. 1-4.

* cited by examiner

*Primary Examiner* — Luu T Pham
*Assistant Examiner* — Paul J Skwierawski
(74) *Attorney, Agent, or Firm* — Holland & Hart LLP

(57) ABSTRACT

A client device that is not originally compliant with a particular security standard (e.g., FIPS) is brought into compliance through the addition of a standard-compliant software-based cryptographic library. In order to adapt the cryptographic library to integrate with the hardware-backed keystore, a non-hardware-backed software keystore is used to store keys used by the cryptographic library. Additionally, in order to provide appropriate security for the software keystore, the software keystore (and/or the keypairs within the software keystore) is protected by a password, and the password is in turn protected by the hardware-backed keystore. Thus, to obtain the password needed to obtain a keypair from the software keystore that is in turn needed to use the cryptographic library, a user must authenticate with the operating system, e.g., by providing biometric credentials.

5 Claims, 3 Drawing Sheets

IMPLEMENTING ENHANCED COMPUTER SECURITY STANDARD FOR SECURE CRYPTOGRAPHIC KEY STORAGE USING A SOFTWARE-BASED KEYSTORE

FIELD OF ART

The present invention generally relates to the field of software systems, and more particularly, to implementation of cryptographic standards on devices not natively complying with those standards.

BACKGROUND

There exist a number of security standards for safely implementing certain types of cryptographic or other security operations. Such standards include the Federal Information Processing Standards (FIPS), and the Federal Risk and Authorization Management Program (FedRAMP). Certain entities, such as the federal government of the United States, may require that organizations comply with these standards in order to exchange data with those entities. Thus, in such instances compliance with the standard in question is beneficial from the perspective both of security and of qualifying for interoperation with such entities.

Some commercially-available devices satisfy the standard (s) in question without additional modification due to the hardware and software that they possess. However, others may fail to satisfy the standards. For example, certain smartphone devices—such as many models using the Android™ operating system—fail to satisfy the FIPS standard, even when they have features such as hardware-backed keystores that provide hardware support for secure storage of digital keys.

SUMMARY

A client device that is not originally compliant with a particular security standard (e.g., FIPS) is brought into compliance through the addition of a standard-compliant software-based cryptographic library. In order to adapt the cryptographic library to integrate with the hardware-backed keystore, a non-hardware-backed software keystore is used to store keys used by the cryptographic library. Additionally, in order to provide appropriate security for the software keystore, the software keystore (and/or the keypairs within the software keystore) is protected by a password, and the password is in turn protected by the hardware-backed keystore. Thus, to obtain the password needed to obtain a keypair from the software keystore that is in turn needed to use the cryptographic library, a user must authenticate with the operating system, e.g., by providing biometric credentials.

The keypairs can then be used for cryptographic operations. For example, in the context of a client device obtaining access to a resource protected by an authentication flow, the commencement of the authentication flow causes the client device to perform the above-described operations to unlock a keypair from the software keystore. With the keypair unlocked, the standard-compliant library can use the keypair to perform cryptographic operations such as signing/verifying, and encrypting/decrypting, as needed within the authentication flow in order to be authenticated and granted access to the resource.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
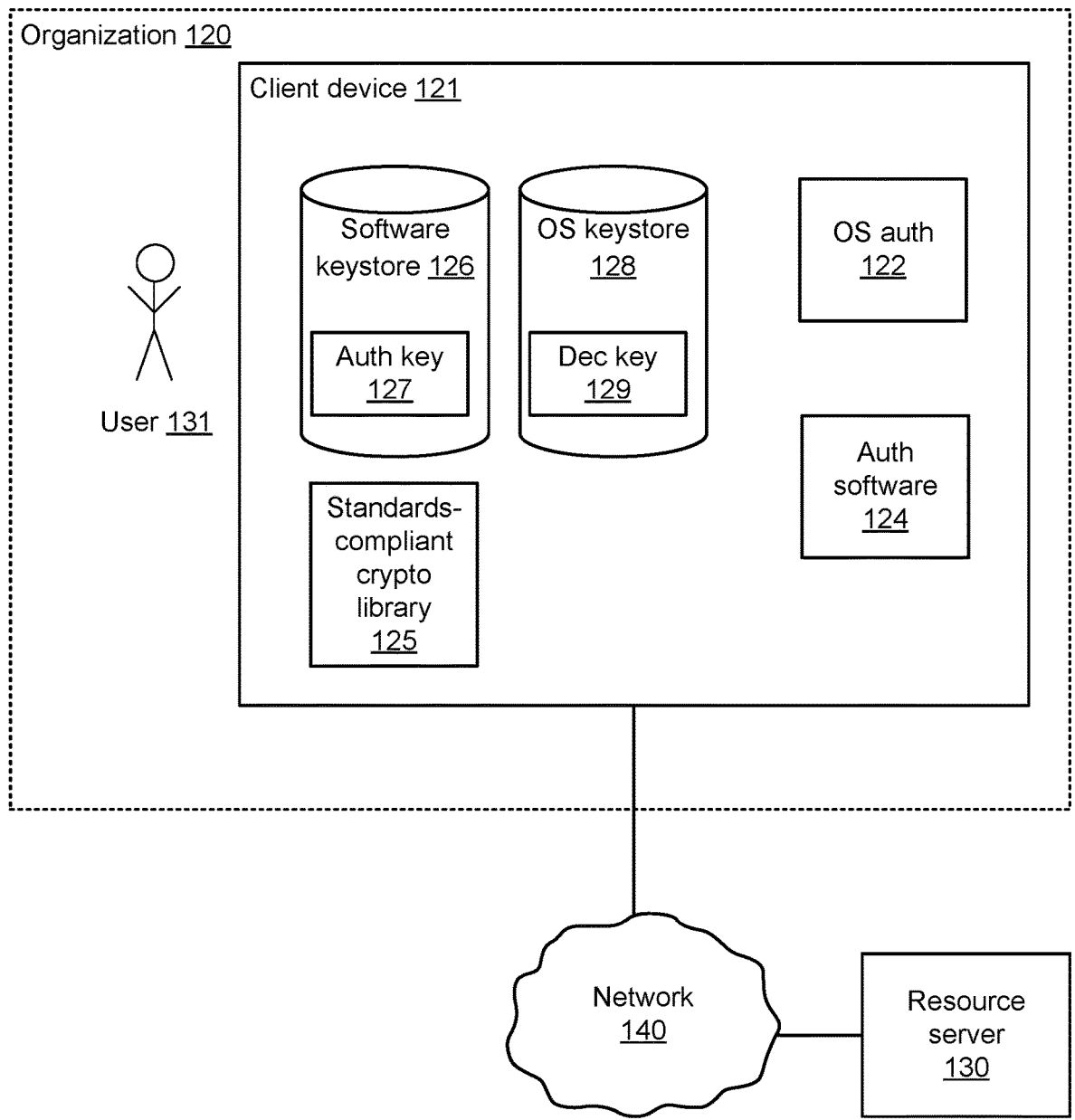
FIG. 1 illustrates one embodiment of a computing environment in which users use client computing devices to obtain access to authenticated resources over a network, according to some embodiments.

FIG. 1 illustrates one embodiment of a computing environment in which users use client computing devices to obtain access to authenticated resources over a network, according to some embodiments. The users are affiliated with an organization (e.g., employees or volunteers of the organization) and may access the resources on behalf of the organization. The users may have multiple accounts on different systems, and the resources that the users access may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, file systems, or the like. Such applications could be, for example, entirely web-based and accessible through a web browser, or could be accessible through a native application installed on the user's client device and communicating with a remote application server. Since each application or other resource could be from a different provider each of which could have a different identity for a user—a single user will typically have many different identities and associated credentials corresponding to the different resources that the user uses. However, for purposes of the invention, a user need only have a single account with a single corresponding identity.

The organization 120 is an entity, such as a business, a school, a governmental agency, or the like, that has a number of affiliated users 131, such as employees or volunteers. One or more client devices 121 (such as client device 121 are registered to the users 131 by the organization 120 (or, in some embodiments, inferred from observation of past successful login patterns), and the users use the client devices to access resources associated with the organization. Although for simplicity FIG. 1 illustrates only a single user 131 and client device 121, there may be any number of either.

The resource server 130 provides access to a resource, such as a web-based application (e.g., MICROSOFT OFFICE 365™), a service, a database, a document, or the like. The resource server 130 may be on a server separate from the system of the organization 120 (as illustrated in FIG. 1), or it may be part of the organization 120. The resource server 130 requires authentication of users before the users may gain access to some or all of its resources.

Physically, the organization 120 is made up of a number of computing systems, including the various client devices 121; one or more internal networks that connects the computing systems, including routers or other networking devices that define the boundary between the organization and external networks; and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The client device 121 can be any device lacking out-of-the-box compliance with a particular security standard (e.g., FIPS). This could include certain models of smartphones, tablets, laptops, desktops, and the like.

The client device has a number of components that interoperate to securely obtain access to cryptographic keys, including an operating system authenticator 122, an operating system keystore 128, a software keystore 126, authentication software 124, and a standards-compliant cryptographic library 125. These components are now described in additional detail.

The operating system authenticator 122 is part of the operating system of the client device 121 and provides authentication of the identity of the user. In some embodiments, the authenticator 122 authenticates the user using biometrics (e.g., analysis of fingerprints, facial recognition, or voice recognition), passwords, and/or one-time passwords (OTPs), or the like.

The operating system keystore 128 is established by the operating system of the client device 121 and uses hardware support of the client device. That is, the keystore 128 is hardware-backed, so that keys stored within the keystore 128 are not directly accessible from outside the keystore 128, and even if the client device data is cloned, the keys in the keystore 128 will still not leave the device.

The software keystore 126, in contrast to the operating system keystore 128, is not hardware-backed. In some embodiments, the software keystore 126 is implemented as a file within the file system of the operating system. In some embodiments, the individual keypairs within the software keystore 126 are each stored in encrypted form, protected by a corresponding password for that keypair. In some embodiments, the file implementing the software keystore 126 is instead or additionally encrypted as a whole according to a password so that its contents are unobtainable without the password. In some embodiments (e.g., such as those in which the operating system is a version of Android™), the software keystore 126 is implemented as a Java™ KeyStore object that is serialized to and from disk.

The standards-compliant cryptographic library 125 implements the security standard(s) of the embodiments in question (e.g., FIPS). The library 125 is implemented in software and uses the keys stored in the software keystore 126, which must therefore be unlocked/unencrypted using the password in order for the keys to be available to the library 125. In one embodiment, SafeLogic™ CryptoComply™, which satisfies the FIPS 140 standard, is used to implement the library 125, though different implementations may be used in different embodiments. In some embodiments, a multi-tenant authentication server provides identity/authentication services to multiple tenant organizations (including the organization 120), and each tenant organization may use its own implementation of the library 125, authored either by itself or by a third party.

Authentication software 124 on the client device(s) 121 facilitates the process of securely obtaining cryptographic keypairs from storage by controlling interactions among the other components of the client device 121. In some embodiments, the authentication software 124 is part of a locally-installed application, such as Okta™ Verify™ from Okta™, Inc. In such embodiments, the authenticator application may have a graphical user interface that the user 131 uses to specify data used to authenticate the user to an authentication system. In other embodiments, the authentication software 124 is implemented as a plugin for another application. The authentication software 124 may additionally use the standards-compliant cryptographic library 125 to perform cryptographic operations as part of an authentication process, once the necessary cryptographic keypair has been retrieved from the software keystore 126.

Figure 2:
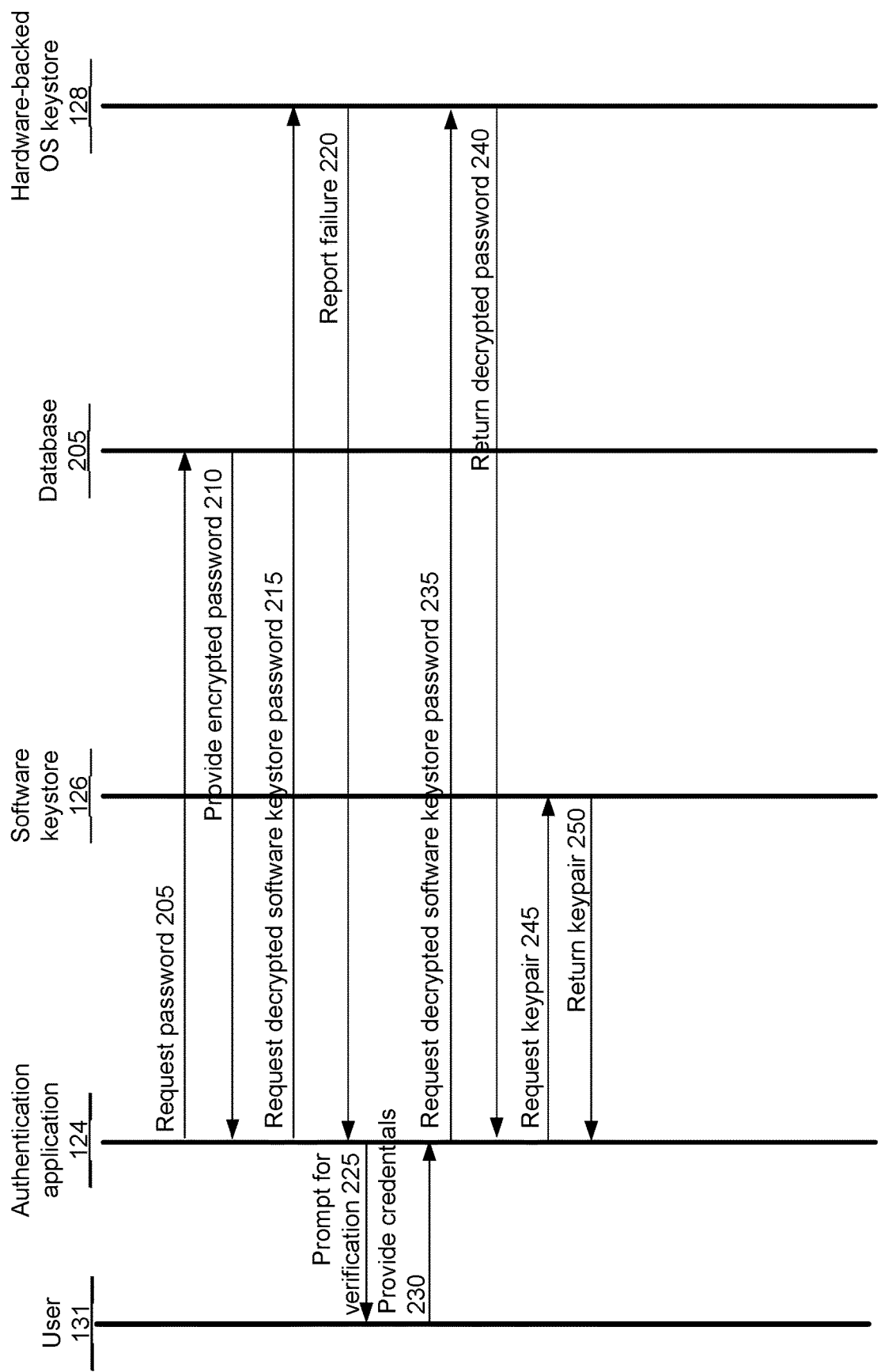
FIG. 2 illustrates interactions between the components of a client device when securely obtaining a keypair from a software keystore as directed by authentication software, according to one embodiment.

FIG. 2 illustrates interactions between the components of the client device 121 when securely obtaining a keypair from the software keystore 126 as directed by the authentication software 124, according to one embodiment.

At the start of the interactions, the software keystore 126 stores an authentication key 127, among other keypairs. Since the keys/keypairs and/or the software keystore 126 itself have been password-protected (encrypted), the authentication key 127 is not available until the password has been supplied and the authentication key 127 accordingly unlocked. An encrypted form of the password for the software keystore 126 is stored in a database 205 (e.g., a SQLite database) within the operating system filesystem. In one embodiment, the database 205 stores, for each of the keypairs that are protected within the software keystore 126: a software keystore key reference (a key alias), an encrypted form of a password required to fetch the key alias from the software keystore 126, and a hardware keystore key alias for decrypting the encrypted password. Similarly, the hardware-backed operating system keystore 128 stores secure decryption key 129. In embodiments in which symmetric key encryption is used for encrypting the password, the decryption key 129 can be the symmetric key itself as used for password encryption, since symmetric keys are readily invertible; in embodiments in which asymmetric key encryption is used, the decryption key 129 is the inverse (e.g., the private key) of the key used for encryption. The authentication software 124 needs to obtain a keypair corresponding to a user 131 and/or the user's device 121 in order to conduct cryptographic operations on behalf of the user. For example, the sequence of interactions of FIG. 2 could have been triggered by the user 131 requesting access to a resource on the resource server 130, leading to an authentication flow (e.g., via a security protocol such as OAuth) in which the authentication software 124 will need to conduct cryptographic operations on behalf of the user, using the standards-compliant cryptographic library 125.

The authentication software 124 requests 205 the encrypted form of the password for the software keystore 126 from the database 205 (e.g., by specifying an ID of the user/device corresponding to the keypair), which provides it in step 210. The database 205 may also provide a reference (key alias) to the secure decryption key stored in the operating system keystore 128 in order to indicate which specific keypair/key is to be used to decrypt the password, and a reference to the keypair in the software keystore 126 to be decrypted.

The authentication software 124 requests 215 the decrypted form of the password from the hardware-backed keystore 128 (e.g., by specifying the reference to the secure decryption key). Assuming that the user 131 has not yet been authenticated by the operating system authenticator 122, the operating system keystore 128 reports 220 that obtaining the decrypted key has failed.

The authentication software 124, upon receipt of the failure report 220, accordingly prompts 225 the user for verification, e.g., using a system call of the operating system to request biometric credentials. The user provides 230 the credentials (e.g., by scanning the user's fingerprint).

The authentication software 124 then again requests 235 the decrypted form of the password. Assuming that the credentials provided in step 230 were legitimate and that the operating system used them to successfully authenticate the user, the OS keystore 128 this time decrypts the encrypted password for the software keystore 126 and returns 240 the decrypted password to the authentication software 124. The request 235 may include the reference to the secure decryption key so that the operating system keystore 128 can determine which key to use to decrypt the password.

The authentication software 124 requests 245 a keypair for the user 131 from the software keystore 126, using the password to decrypt the software keystore 126 so that the keypair is no longer encrypted. The software keystore accordingly returns 250 the requested keypair in unencrypted form.

With the keypair for the user obtained at step 250, the authentication software 124 can use it to perform any needed cryptographic operations. For example, the standards-compliant cryptographic library 125 can be called by the authentication software 124 to perform digital signature operations (using the obtained keypair) as part of an OAuth flow for accessing a resource.

Note that although the interactions of FIG. 2 were described as occurring in a particular order, variations are possible in different embodiments, such as alteration of the order, performing operations in parallel rather than strictly sequentially, and the like.

Further note that although the above examples have described the inventive operations within the context of the client device 121 of an organization obtaining access to a resource on a resource server 130, the inventive operations may also be used in other contexts. More generally, the inventive operations may be used in any context in which a non-standard-compliant client device having a hardware-backed keystore is desired to achieve compliance with the standard.

Figure 3:
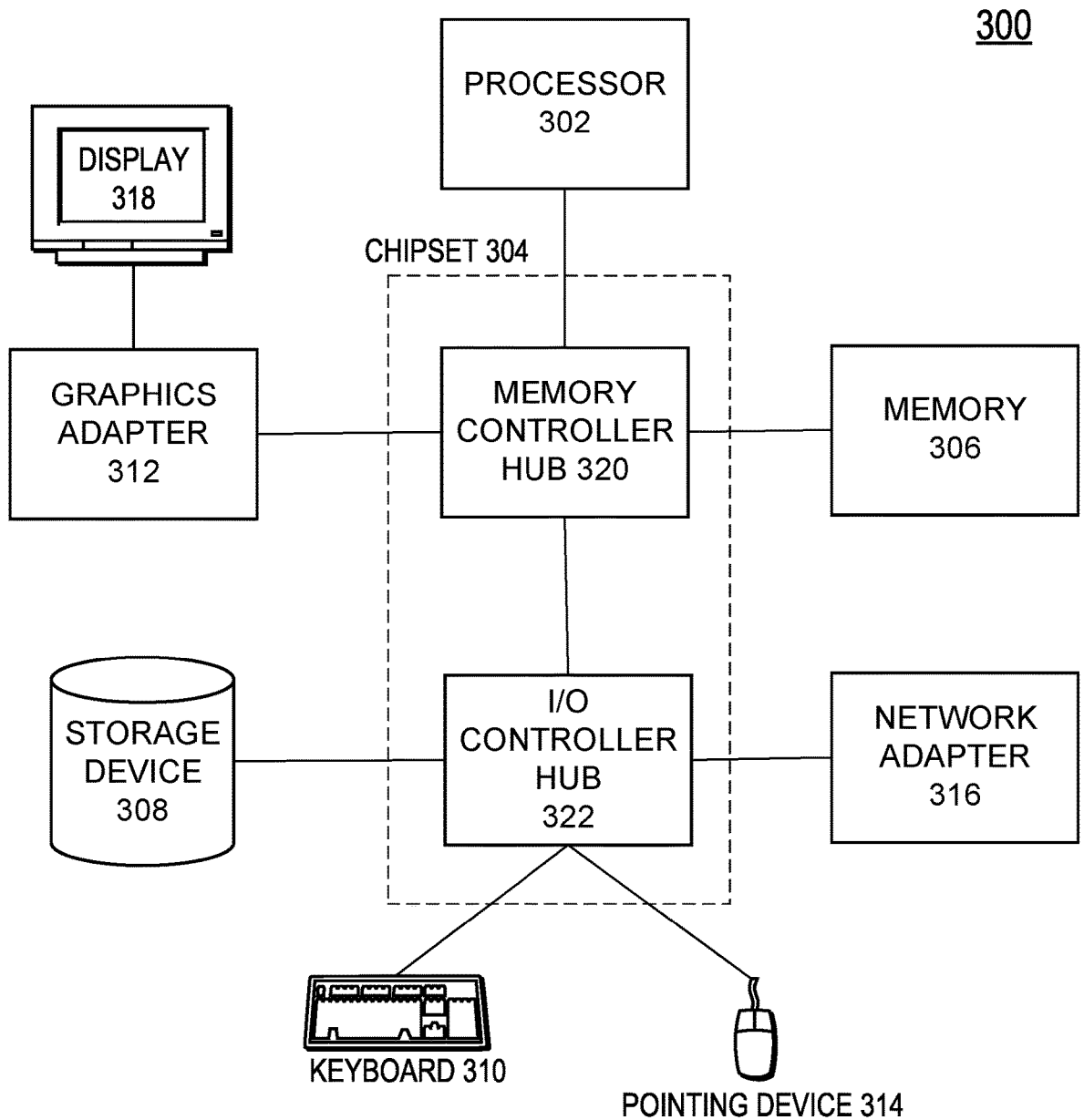
FIG. 3 is a high-level block diagram illustrating physical components of a computer used as part or all of (for example) the client device of FIG. 1, according to one embodiment.

FIG. 3 is a high-level block diagram illustrating physical components of a computer 300 used as part or all of (for example) the client device 121 of FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for obtaining and using a cryptographic keypair within a resource authentication flow on a client device comprising a software keystore and a hardware-backed keystore, the computer-implemented method comprising:
   receiving a request from a user to access a resource on a remote resource server;
   receiving data beginning an authentication flow with the remote resource server;
   obtaining an encrypted form of a software keystore password of the software keystore and a reference to a secure decryption key of a plurality of secure decryption keys of the hardware-backed keystore of the client device, differing secure decryption keys of the plurality of secure decryption keys being useable to decrypt differing software keystore passwords of the software keystore;
   requesting access to a decrypted form of the software keystore password from the hardware-backed keystore of an operating system of the client device, the access request including the encrypted form of the software keystore password and the reference to the secure decryption key, the access request causing the operating system to verify biometric credentials of the user;
   responsive to the operating system successfully verifying the biometric credentials of the user, obtaining the decrypted form of the software keystore password from the hardware-backed keystore, the hardware-backed keystore using the secure decryption key to decrypt the encrypted form of the software keystore password;
   obtaining a keypair of the user from the software keystore using the decrypted form of the software keystore password obtained from the hardware-backed keystore; and
   using the obtained keypair for secure communication within the authentication flow.

2. A non-transitory computer-readable storage medium storing instructions that when executed by a computer processor perform actions comprising:
   receiving a request from a user to access a resource on a remote resource server;
   receiving data beginning an authentication flow with the remote resource server;
   obtaining an encrypted form of a software keystore password of a software keystore and a reference to a secure decryption key of a plurality of secure decryption keys of a hardware-backed keystore of a client device, differing secure decryption keys of the plurality of secure decryption keys being useable to decrypt differing software keystore passwords of the software keystore, the client device comprising the software keystore and the hardware-backed keystore;
   requesting access to a decrypted form of the software keystore password from the hardware-backed keystore of an operating system of the client device, the access request including the encrypted form of the software keystore password and the reference to the secure decryption key, the access request causing the operating system to verify biometric credentials of a user of the client device;
   responsive to the operating system successfully verifying the biometric credentials of the user, obtaining the decrypted form of the software keystore password from the hardware-backed keystore, the hardware-backed keystore using the secure decryption key to decrypt the encrypted form of the software keystore password;
   obtaining a keypair of the user from the software keystore using the decrypted form of the software keystore password obtained from the hardware-backed keystore, and
   using the obtained keypair for secure communication within the authentication flow.

3. The non-transitory computer-readable storage medium of claim 2, the actions further comprising:
   receiving a request from the user to access a resource on a remote resource server;
   receiving data from the remote resource server beginning an authentication flow; and
   using the obtained keypair for secure communication within the authentication flow.

4. The non-transitory computer-readable storage medium of claim 2, the actions further comprising:
obtaining the reference to the secure decryption key, wherein:
the access request includes the reference to the secure decryption key, and
the hardware-backed keystore uses the secure decryption key to decrypt the encrypted form of the software keystore password.

5. The non-transitory computer-readable storage medium of claim 2, wherein the credentials are biometric credentials.

\* \* \* \* \*